(12) United States Patent
Kim et al.

(10) Patent No.: US 8,711,807 B2
(45) Date of Patent: Apr. 29, 2014

(54) METHOD AND APPARATUS FOR COMPENSATING QOS DURING HANDOVER BY BASE STATION IN WIRELESS BROADBAND ACCESS SYSTEM

(75) Inventors: Jae-Young Kim, Yongin-si (KR); Han-Seok Kim, Seoul (KR); Ho-Young Choi, Seoul (KR); Soo-Yong Shin, Suwon-si (KR); Bong-Joo Kim, Ansan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 422 days.

(21) Appl. No.: 12/902,628

(22) Filed: Oct. 12, 2010

(65) Prior Publication Data

US 2011/0090871 A1     Apr. 21, 2011

(30) Foreign Application Priority Data

Oct. 21, 2009     (KR) .................. 10-2009-0100330

(51) Int. Cl.
*H04W 4/00* (2009.01)
*H04W 36/00* (2009.01)

(52) U.S. Cl.
USPC .......................... 370/331; 455/436

(58) Field of Classification Search
USPC .......................... 370/331; 455/436
See application file for complete search history.

(56) References Cited

U.S. PATENT DOCUMENTS

| | | | |
|---|---|---|---|
| 8,045,525 B1 * | 10/2011 | Bontu et al. ............ | 370/331 |
| 2003/0133415 A1 * | 7/2003 | Kim et al. .............. | 370/235 |
| 2004/0219938 A1 * | 11/2004 | Parantainen et al. ..... | 455/502 |
| 2005/0250498 A1 * | 11/2005 | Lim et al. ............. | 455/436 |
| 2007/0105563 A1 * | 5/2007 | Ro et al. .............. | 455/452.2 |
| 2007/0293225 A1 * | 12/2007 | Kangude et al. ........ | 455/436 |
| 2009/0170517 A1 * | 7/2009 | Karlsson et al. ........ | 455/436 |
| 2010/0142486 A1 * | 6/2010 | Wahlqvist et al. ...... | 370/332 |

OTHER PUBLICATIONS

WiMAX Forum, "WiMAX Forum Network Architecture (Stage 3: Detailed Protocols and Procedures)", Release 1, Version 1.3.0, Nov. 2, 2008.

* cited by examiner

*Primary Examiner* — Noel Beharry
*Assistant Examiner* — Kodzovi Acolatse
(74) *Attorney, Agent, or Firm* — Jefferson IP Law, LLP

(57) ABSTRACT

An apparatus and method for compensating Quality of Service (QoS) during a handover of a Mobile Station (MS) by a serving Base Station (BS) and a target BS in a wireless broadband access system are provided. The method includes generating a message during a handover from the serving BS to a target BS, the message including at least one of a data transmission/reception time just before the handover, a size of a time window for which a data transmission/reception history is recorded in an accumulated way, and an amount of data transmitted/received during the time window, and transmitting the message to the target BS. The target BS can more accurately find a handover break time and the amount of data transmission/reception in the serving BS at the time the MS has been handed over to the target BS, enabling fast and adequate QoS compensation/correction for each QoS class, and thus facilitating flexible, efficient and accurate QoS provisioning regardless of controlled handover and uncontrolled handover.

20 Claims, 10 Drawing Sheets

QoS Parameters

| Type | 141 |
|---|---|
| Length in octets | Variable |
| Value | Compound |
| Description Elements (Sub-TLVs) | This compound TLV contains all Parameters pertaining to a specific QoS Description |

| TLV Name | M/O |
|---|---|
| BE Data Delivery Service | O |
| UGS Data Delivery Service | O |
| NRT-VR Data Delivery Service | O |
| RT-VR Data Delivery Service | O |
| ERT-VR Data Delivery Service | O |
| Global Service Class Name | O |
| Service Class Name | O |
| Media Flow Description in SDP Format | O |
| Reduced Resources Code | O |
| Data Integrity | O |

| Parent TLV | SF Info |
|---|---|

FIG.1

| SFID | Time stamp | Tx or Rx Amont | Rate Window |
|---|---|---|---|
| 1234 | 2009-07-05 12:35:42.025 | 256 bytes | 10 frames |
| 5678 | 2009-07-12 11:10:18.930 | 1240 bytes | 20 frames |
| .... | .... | .... | .... |
| | | | |

| Type | Name | Length | Meaning |
|---|---|---|---|
| xxx | Time Stamp (600) | 4 bytes | Last Frame Time in UTC Format in msec (frame time) |
| yyy | Last Amount (602) | 4 bytes | Number of Tx/Rx Bytes during Rate Window |
| zzz | Rate Window (604) | 2 bytes | Number of Frames for Accumulating Tx/Rx Data |
| .... | .... | .... | .... |
|  |  |  |  |

FIG.6

QoS Parameters

| Type | 141 |
|---|---|
| Length in octets | Variable |
| Value | Compound |
| Description | This compound TLV contains all Parameters pertaining to a specific QoS Description |
| Elements (Sub-TLVs) | TLV Name | M/O |
| | BE Data Delivery Service | O |
| | UGS Data Delivery Service | O |
| | NRT-VR Data Delivery Service | O |
| | RT-VR Data Delivery Service | O |
| | ERT-VR Data Delivery Service | O |
| | Global Service Class Name | O |
| | Service Class Name | O |
| | Media Flow Type | O |
| | Media Flow Description in SDP Format | O |
| | Reduced Resources Code | O |
| | Data Integrity | O |
| | QoS Status (700) | O |
| Parent TLV | SF Info |

FIG.7

QoS Status

| Type | xxx | |
|---|---|---|
| Length in octets | Variable | |
| Value | Compound | |
| Description | This compound TLV contains all Parameters pertaining to a specific QoS Status | |
| Elements (Sub-TLVs) | TLV Name | M/O |
| | Media Flow Description in SDP Format | O |
| | Time Stamp (600) | O |
| | Last Amount (602) | O |
| | Rate Window (604) | O |
| Parent TLV | QoS Parameters | |

FIG.8

METHOD AND APPARATUS FOR COMPENSATING QOS DURING HANDOVER BY BASE STATION IN WIRELESS BROADBAND ACCESS SYSTEM

PRIORITY

This application claims the benefit under 35 U.S.C. §119(a) of a Korean patent application filed in the Korean Intellectual Property Office on Oct. 21, 2009 and assigned Serial No. 10-2009-0100330, the entire disclosure of which is hereby incorporated by reference.

BACKGROUND OF THE INVENTION

1. Field of the Invention

The present invention relates to controlling handover and Quality of Service (QoS) in a wireless broadband access system. More particularly, the present invention relates to a method and apparatus for more accurately compensating QoS in a target Base Station (BS) after a handover.

2. Description of the Related Art

In a wireless broadband access system, a Service Flow (SF), necessary for data transmission/reception, is generated during network entry of a Mobile Station (MS). Each SF has a QoS profile in accordance with QoS requirements, and, depending on the QoS profile, a Base Station (BS) allocates wireless resources to the MS through appropriate scheduling.

When an MS moves between a serving BS and a target BS, a handover takes place between the BSs. During the handover between the serving BS and the target BS, the MS may suffer from interruption of its transmission traffic. Because of the procedure necessary for handover signaling, the traffic transmission/reception between the MS and the BSs may be interrupted for anywhere from tens of milliseconds (msec) to hundreds of msec. In this case, for an SF belonging to a QoS class having a real-time requirement, its QoS requirements may not be satisfied during the handover.

To provide the intact SF, which was being maintained in the serving BS, in the target BS, the Worldwide Interoperability for Microwave Access (WiMAX) Forum standard delivers an SF profile (SF_Info) from the serving BS to the target BS through an R6_HO_Cnf message of an R6 interface. However, since the target BS considers only SF_Info from the serving BS regarding static QoS requirements, such as the QoS class type, an MS, which has been handed over to the target BS, has no way to identify a dissatisfaction in terms of QoS requirements due to the handover break time. So, every QoS class type may cause various different problems.

According to the Institute of Electrical and Electronics Engineers (IEEE) 802.16 standard, there are four QoS class types including Unsolicited Grant Service (UGS), Real-time Polling Service (rtPS), Non-real-time Polling Service (nrtPS), and Best Effort (BE). Each of these service types has different traffic characteristics and QoS requirements.

Because UGS traffic requires a fixed rate, a BS's scheduler should immediately serve this traffic. As for rtPS traffic corresponding to a real-time SF, it has minimum required throughput per time and is limited in data transmission delay. In contrast, nrtPS traffic corresponding to a non-real-time SF is not limited in data transmission delay and has a maximum sustained rate condition meaning that despite sufficient capacity, the maximum rate should be sustained. BE traffic has the lowest priority in QoS class, and has only the maximum sustained rate condition without the need to guarantee a minimum reserved rate.

In the case of UGS, if an MS receives insufficient grants, the MS cannot help but notify of the abnormality using a Sleep Indicator (SI) bit. However, since it is provided in the standard that in response thereto, it should undergo compensation of about 1% for each SI bit, the response is delayed until the MS reaches the desired grants.

In the case of rtPS, to guarantee the minimum reserved rate, more grants are required. However, the grants are not received during the handover break and a target BS cannot determine the duration of the handover break. Therefore, the target BS has no criteria for adequately compensating the MS. Accordingly, the target BS may excessively compensate the MS, or the compensation may be inadequate and thus fail to satisfy the minimum reserved rate.

In addition, in the case of BE or nrtPS having the maximum sustained rate condition, since the target BS cannot determine the duration of the handover break, it is difficult to make adequate compensation so that the traffic should not exceed the maximum sustained rate.

SUMMARY OF THE INVENTION

An aspect of the present invention is to address at least the above-mentioned problems and/or disadvantages and to provide at least the advantages described below. Accordingly, an aspect of the present invention is to provide a method and apparatus in which, when an MS performs a handover, a target Base Station (BS) can make a more exact Quality of Service (QoS) compensation for each SF during a handover break time.

Another aspect of the present invention is to provide a method and apparatus for performing flexible QoS compensation by a BS regardless of controlled handover or uncontrolled handover.

Another aspect of the present invention is to provide an appropriate additional scheduling method and apparatus for satisfying the requirements for each QoS class type.

In accordance with an aspect of the present invention, a method for compensating QoS during a handover of a Mobile Station (MS) by a serving BS in a wireless broadband access system is provided. The method includes generating a message during a handover from the serving BS to a target BS, the message including at least one of a data transmission/reception time just before the handover, a size of a time window for which a data transmission/reception history is recorded in an accumulated way, and an amount of data transmitted/received during the time window, and transmitting the message to the target BS.

In accordance with another aspect of the present invention, a serving BS for compensating QoS during a handover of an MS in a wireless broadband access system is provided. The serving BS apparatus includes a control module for generating a message including at least one of a data transmission/reception time just before the handover, a size of a time window for which a data transmission/reception history is recorded in an accumulated way, and an amount of data transmitted/received during the time window, and a transmission module for transmitting the message to a target BS.

In accordance with further another aspect of the present invention, a method for compensating QoS during a handover of an MS by a target BS in a wireless broadband access system is provided. The method includes receiving a message including at least one of a data transmission/reception time just before the handover, a size of a time window for which a data transmission/reception history is recorded in an accumulated way, and an amount of data transmitted/received during the time window, reading from the message at least one of the data transmission/reception time, the size of a time window, and the amount of transmitted/received data, and calculating a data rate during a handover break time using a predetermined value if there is information which is missing from the message, and performing QoS compensation during the handover break time using the data rate.

In accordance with yet another aspect of the present invention, a target BS apparatus for compensating QoS during a handover of an MS in a wireless broadband access system is provided. The target BS apparatus includes a reception module for receiving a message including at least one of a data transmission/reception time just before the handover, a size of a time window for which a data transmission/reception history is recorded in an accumulated way, and an amount of data transmitted/received during the time window, and a control module for reading from the message at least one of the data transmission/reception time, the size of a time window, and the amount of transmitted/received data, calculating a data rate just before the handover using a predetermined value if there is information which is missing from the message, and performing QoS compensation during a handover break time using the data rate.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 1 is a table showing a format of a Quality of Service (QoS) Parameters Time Length Value (TLV) Information Element (IE) according to an exemplary embodiment of the present invention;

FIG. 6 is a table showing three TLVs for transmission/reception history according to an exemplary embodiment of the present invention;

FIG. 7 is a table showing a format of a QoS Parameters TLV according to an exemplary embodiment of the present invention;

FIG. 8 is a table showing a format of a QoS Status TLV according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

When a Mobile Station (MS) performs a handover from a serving Base Station (BS) to a target BS, the serving BS delivers a Service Flow (SF) profile (SF_Info) to the target BS through an R6_HO_Cnf message so that the target BS can maintain the SF that the serving BS was providing. The R6_HO_Cnf message includes a QoS parameter Type-Length-Value (TLV) Information Element (IE) carrying all configuration values regarding the SF provided by the serving BS.

FIG. 1 shows a format of a QoS Parameters TLV IE according to an exemplary embodiment of the present invention.

Each TLV of the SF_Info profile transmitted through the R6_HO_Cnf message is a TLV carrying all configuration values of an SF. The SF_Info TLV has a QoS Parameters TLV, as a sub TLV. The QoS Parameters TLV records QoS status information of the SF.

Figures 2, 3:
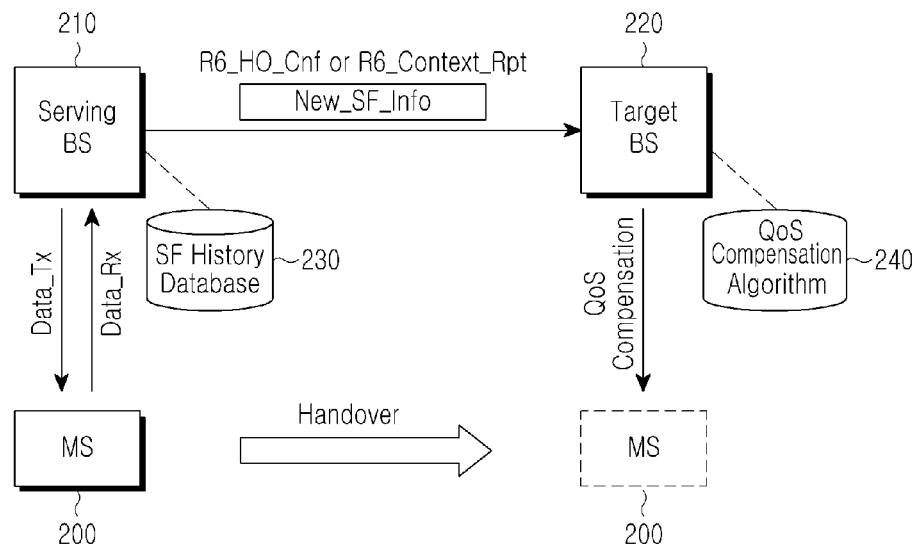
FIG. 2 is a diagram showing a structure for message generation and exchange between a serving Base Station (BS) and a target BS according to an exemplary embodiment of the present invention.
FIG. 3 is a diagram showing transmission/reception history for each Service Flow (SF), recorded in an SF history database, according to an exemplary embodiment of the present invention.

FIG. 2 is a diagram showing a structure for message generation and exchange between a serving BS and a target BS according to an exemplary embodiment of the present invention.

Referring to FIG. 2, an exemplary structure for message generation and exchange includes an SF history database 230 for recording transmission/reception history information for each SF in a serving BS 210, the serving BS 210 for generating and transmitting New_SF_Info obtained by adding additional information to the existing SF_Info based on information of the SF history database 230, a target BS 220 for receiving the New_SF_Info and using it for QoS compensation, and a QoS compensation algorithm 240 for assisting the target BS 220 in providing QoS compensation to an MS 200. Meanwhile, it should be noted that the components described and shown in connection with FIG. 2 are merely illustrative, and are not meant to convey every technical aspect in support of the present invention.

Generation of the New_SF_Info is managed by a control module (not shown) in the serving BS 210, and transmission thereof is managed by a transmission module (not shown) in the serving BS 210. Reception of the New_SF_Info is managed by a reception module (not shown) in the target BS 220, and QoS compensation based thereon is managed by a control module (not shown) in the target BS 220 with input from the QoS compensation algorithm 240.

The serving BS 210 manages transmission/reception history of each SF, which is generated dynamically every time the MS 200 accesses the serving BS 210, or generated if necessary. For each SF, the transmission/reception history may be recorded in the SF history database 230 every time either transmission packets (in the case of a Downlink (DL) SF) or reception packets (in the case of an Uplink (UL) SF) are generated.

FIG. 3 is a diagram showing transmission/reception history for each SF, recorded in an SF history database, according to an exemplary embodiment of the present invention.

Referring to FIG. 3, the transmission/reception history is recorded in the form of a table, which includes a Service Flow IDentifier (SFID), a Time Stamp based on Coordinated Universal Time (UTC), a Tx or Rx Amount of data that has been transmitted/received for a predetermined time period up to the time the history is recorded, and a Rate Window reflecting the size of the predetermined time window. Meanwhile, it should be noted that the description made in connection with FIG. 3 is merely illustrative, and is not intended to limit the scope of the present invention thereto.

Figure 4:
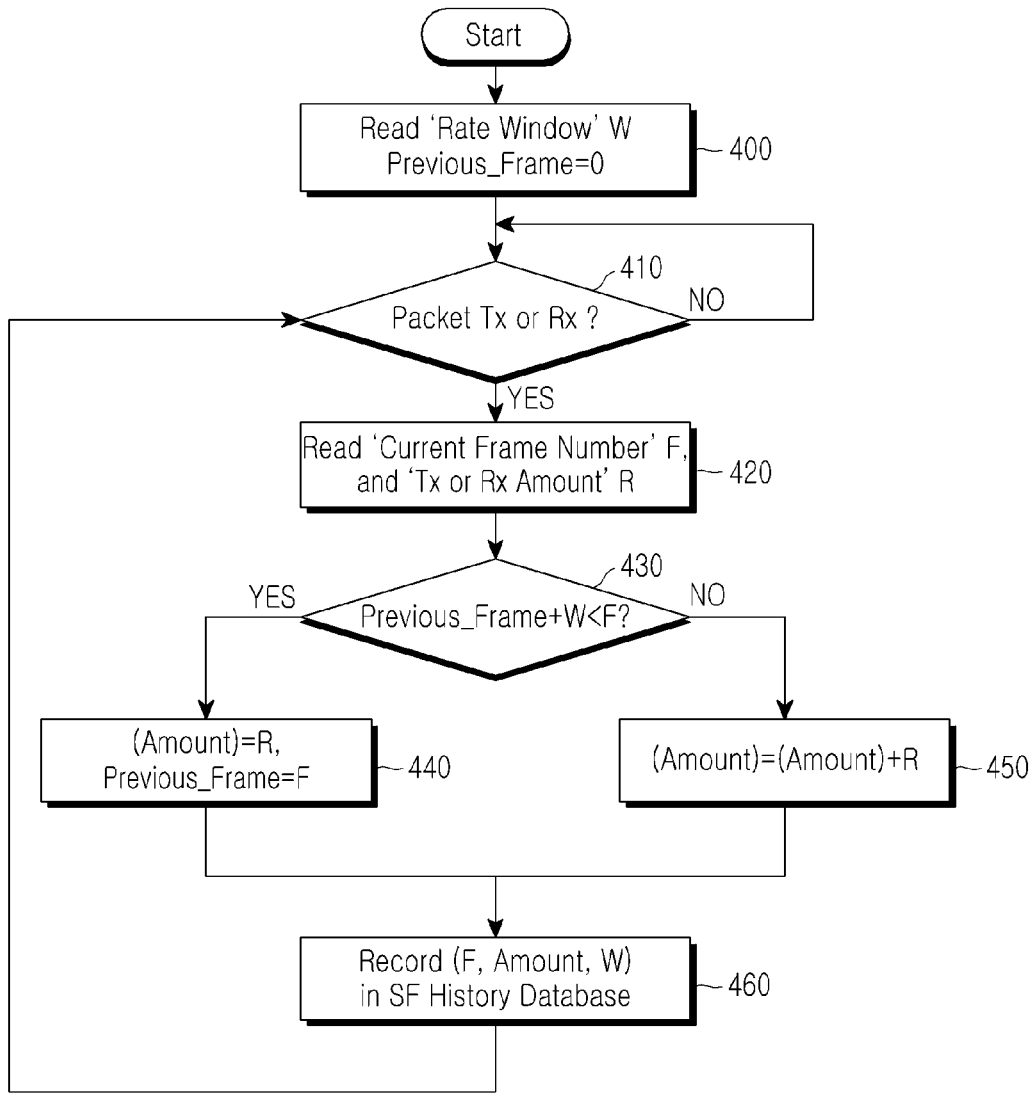
FIG. 4 is a diagram showing an example of an algorithm for managing an SF history database according to an exemplary embodiment of the present invention.

FIG. 4 is a diagram showing an example of an algorithm for managing an SF history database according to an exemplary embodiment of the present invention.

Referring to FIG. 4, for every SF, an algorithm for managing a history database may be different according to QoS characteristics, and an example of an algorithm for recording packet transmission/reception history is shown in FIG. 4, by way of example only.

In step 400, a serving BS reads a predetermined rate window W, and sets a previous frame number Previous_Frame to 0. In step 410, the serving BS determines whether packet transmission (Tx) or reception (Rx) has occurred. If it is determined in step 410 that packet Tx or Rx has occurred, the serving BS reads the current frame number F and the amount R of transmitted/received data in step 420. In step 430, the serving BS determines whether the current frame number F is greater than a sum of the previous frame number Previous_Frame and the rate window W (i.e., whether a difference between the current frame number F and the previous frame number Previous_Frame is greater than the rate window W).

If it is determined in step 430 that the current frame number F is greater than a sum of the previous frame number Previous_Frame and the rate window W (i.e., if a frame greater than the rate window has elapsed between the previous frame and the current frame), the serving BS initializes the data amount 'Amount' by setting it to the R and shifts a location of Previous_Frame by setting the Previous_Frame to the current frame number F, in step 440. In step 460, the serving BS records (F, Amount, W) in the SF history database in association with an SFID. The recorded data transmission/reception history may have the format illustrated in FIG. 3 by example.

However, if it is determined in step 430 that the current frame number F is not greater than a sum of the previous frame number Previous_Frame and the rate window W (i.e., if a frame in the size of the rate window has not elapsed between the previous frame and the current frame), the serving BS adds R to the data amount 'Amount' in an accumulated way in step 450. Thereafter, in step 460, (F, Amount, W) are recorded in the SF history database in relation to an SFID. As stated above, the recorded data transmission/reception history may have the format illustrated in FIG. 3.

Figure 5:
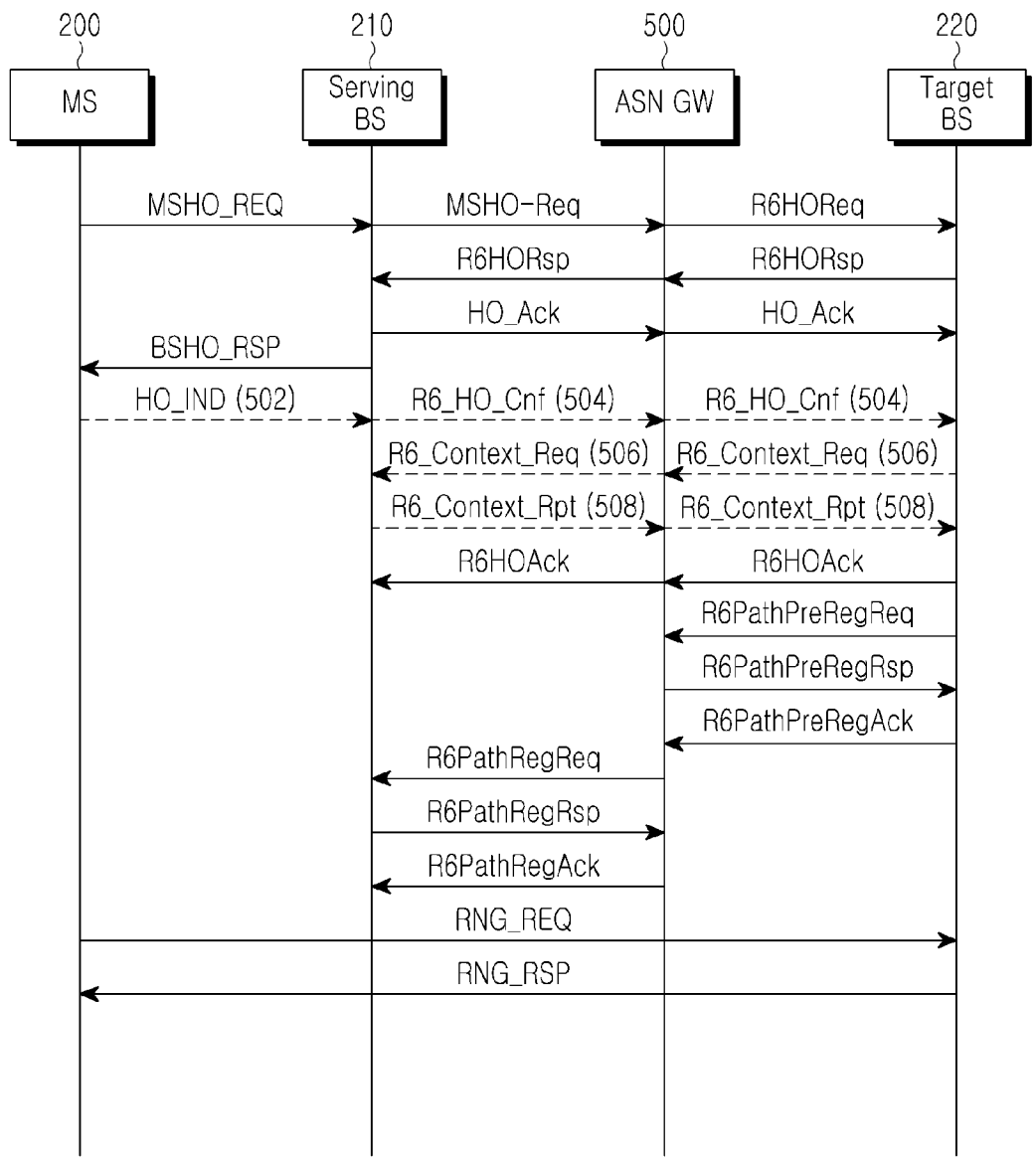
FIG. 5 is a diagram showing a process of maintaining an SF of a Mobile Station (MS) in a target BS by transmitting/receiving New_SF_Info in a handover process according to an exemplary embodiment of the present invention.

FIG. 5 is a diagram showing a process of maintaining an SF of an MS in a target BS by transmitting/receiving New_SF_Info in a handover process according to an embodiment of the present invention.

Referring to FIG. 5, at the time an MS 200 performs a handover between BSs, a serving BS 210 delivers New_SF_Info (to be specific, QoS Parameters TLV) of the MS 200 to a target BS 220 through an R6 interface. More specifically, an MS initiates a handover by transmitting an MS handover request (MSHO_REQ) message to the serving BS 210. The serving BS 210 transmits an MSHO_Req message to an Access Service Network Gateway (ASN GW) 500 which, in turn, transmits a handover request message (R6HOReq) over the R6 interface to the target BS 220. The target BS 220 transmits a handover response message over the R6 interface (R6HORsp) to the ASN GW 500 which transmits a corresponding response to the serving BS 210. The serving BS 210 transmits a handover acknowledgment (HO_Ack) message to the ASN GW 500 which transmits a corresponding acknowledgment to the target BS 220. Also, the serving BS 210 transmits a handover response message (BSHO_RSP) to the MS 200 that originated the handover.

More specifically, in the case of a controlled handover, in which, after transmitting the handover response (BSHO_RSP) message to the MS 200, the serving BS 210 receives a handover indication (HO_IND) message 502 from the MS 200, New_SF_Info (to be specific, QoS Parameters TLV) is included in a handover configuration (R6_HO_Cnf) message 504, which is transmitted from the serving BS 210 to the target BS 220 through the ASN GW 500 after the HO_IND message 502 is received at the serving BS 210.

On the other hand, in the case of an uncontrolled handover, in which after transmitting a handover response (HO_RSP) message to the MS 200, the serving BS 210 does not receive a handover indication (HO_IND) message 502 from the MS 200, the target BS 220 transmits a context request (R6_Context_Req) message 506 to the serving BS 210, since the target BS 220 cannot expect the R6_HO_Cnf message 504 transmitted from the serving BS 210. Therefore, in response to the R6_Context_Req message 506, the serving BS 210 includes New_SF_Info (to be specific, QoS Parameters TLV) in a context report (R6_Context_Rpt) message 508, and delivers it to the target BS 220.

A process of transmitting/receiving other messages uninvolved in the delivery of SF_Info will not be described since it is not related to the present invention. It should be noted that the message delivery process described in connection with FIG. 5 is a mere example of realizing message delivery for delivering information according to exemplary embodiments of the present invention, and it is not necessary that all messages shown in the drawing should be delivered.

FIG. 6 is a table showing three TLVs for transmission/reception history are written, according to an exemplary embodiment of the present invention.

Referring to FIG. 6, to include transmission/reception history in SF_Info (to be specific QoS Parameters TLV) on an R6 interface of the Worldwide Interoperability for Microwave Access (WiMAX) Forum standard, at least one of the additional TLVs specified in FIG. 6 is needed.

A 4-byte (or 32-bit) Time Stamp TLV 600 is recorded in the form of UTC, and represents the last transmission/reception time of the SF. A 4-byte (or 32-bit) Last Amount TLV 602 represents in bytes the amount of data transmitted/received during the last time window. A 2-byte (16-bit) Rate Window TLV 604 represents in frame length a predetermined time period (i.e., time window) for which the amount of transmitted/received data is accumulated. In an exemplary implementation, more accurate QoS compensation is possible, if all three of the TLVs are used.

FIG. 7 is a table showing a format of a QoS Parameters TLV according to an exemplary embodiment of the present invention.

Referring to FIG. 7, to include at least one of the three TLVs, the QoS Parameters TLV further includes a QoS_Status TLV 700 as a sub TLV. It should be noted that FIG. 7 shows a mere example of the QoS Parameters TLV according to the present invention, and it is not necessary that all TLVs constituting the TLV format should be included.

FIG. 8 is a table showing a format of a QoS Status TLV according to an exemplary embodiment of the present invention.

Referring to FIG. 8, a QoS_Status TLV, an additional compound TLV, has three additional TLVs—Time Stamp TLV 600, Last Amount TLV 602, and Rate Window TLV 604—as its sub TLVs.

Therefore, upon receiving New_SF_Info (e.g., QoS Status TLV in QoS Parameters TLV), the target BS 220 may determine a handover break time, an amount of data transmitted/received just before the break time, and/or a size of a rate window, for each SF of an MS that has now received a handover request, and may determine a data rate from the break time, the data amount, and/or the rate window.

In other words, upon receiving the New_SF_Info, the target BS 220 may determine a reliable data rate along with at least one of a predetermined or arbitrary break time, a data amount, and a rate window, using at least one of the break time, the data amount and the rate window, which are found from the New_SF_Info. In an exemplary implementation, the target BS 220 may perform accurate QoS compensation using all of the break time, the data amount, and the rate window.

In this case, an average data rate Avg_Rate during the handover break time can be determined using Equation (1), $$\text{Avg\_Rate} = \text{Amount}/(C - F + W) \quad (1)$$

where C represents the current frame number computed from the current time, Amount represents the amount of data just before the break time, F represents a frame number during data transmission/reception, computed from the transmission/reception time, and W represents a size of a rate window. The Amount, F and W may be read from New_SF_Info (e.g., QoS Status TLV in QoS Parameters TLV) received from the serving BS, or may be values, which are predetermined or arbitrarily set. In an exemplary implementation, more accurate QoS compensation is possible, when all of the Amount, F and W are used.

Rather than performing scheduling in which requirements of a QoS profile are newly applied from the handover completion time, the target BS 220 performs scheduling in which it applies a new QoS profile after rapidly performing QoS compensation/correction using the transmission/reception history New_SF_Info received from the serving BS 210.

Figure 9:
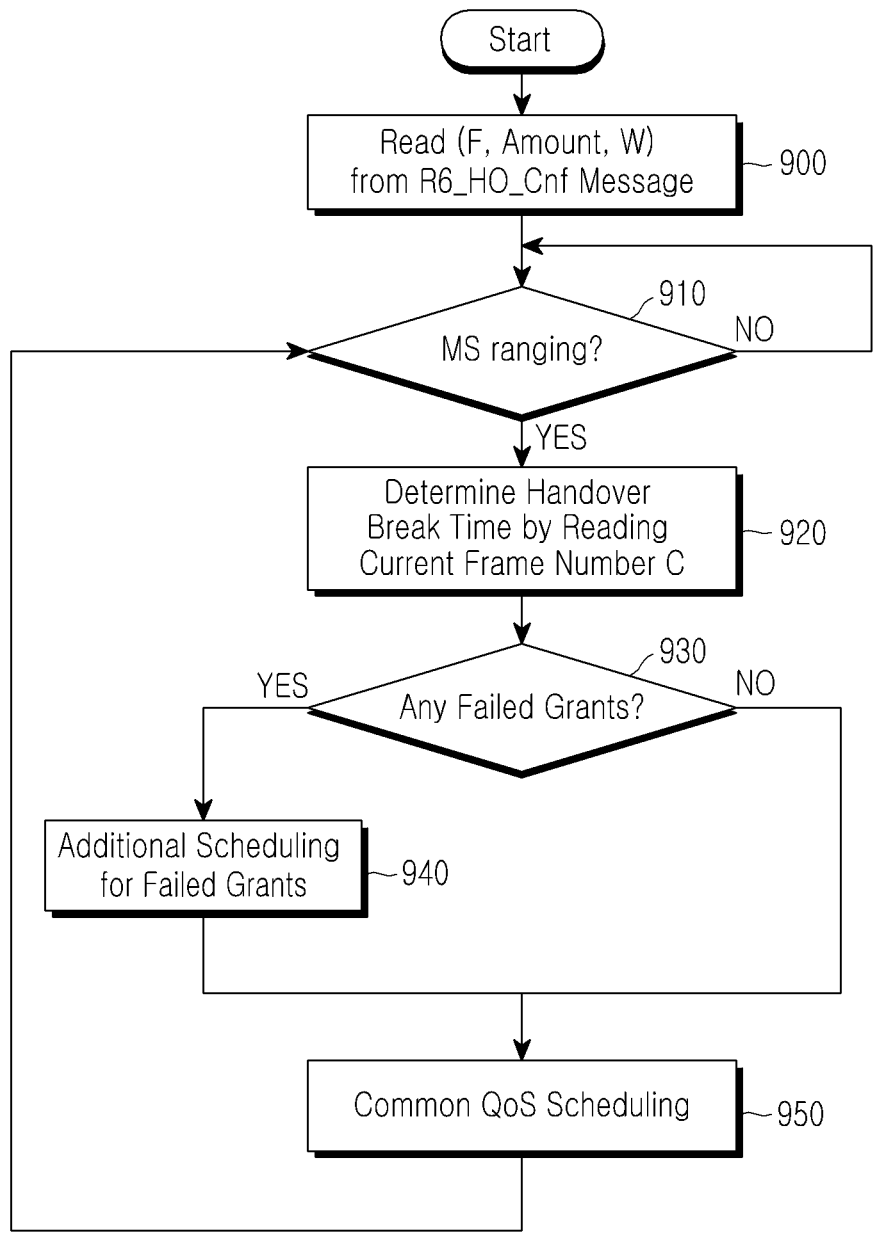
FIG. 9 is a diagram showing a QoS compensation/correction algorithm for handling grants that a target BS has failed to transmit/receive during a handover break time, according to an exemplary embodiment of the present invention.
Figure 10:
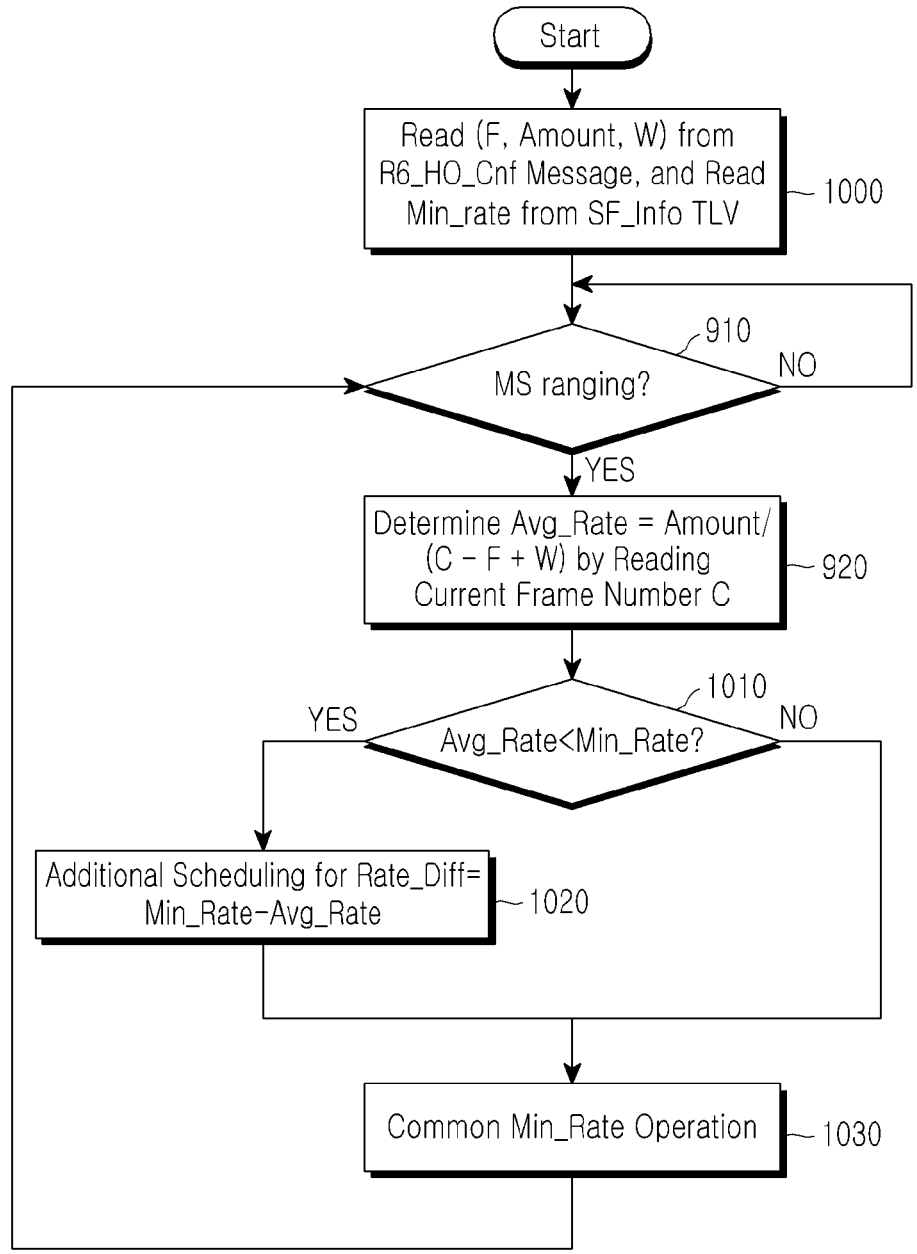
FIG. 10 is a diagram showing a QoS compensation/correction algorithm for minimum reserved rate processing in a target BS according to an exemplary embodiment of the present invention.
Figure 11:
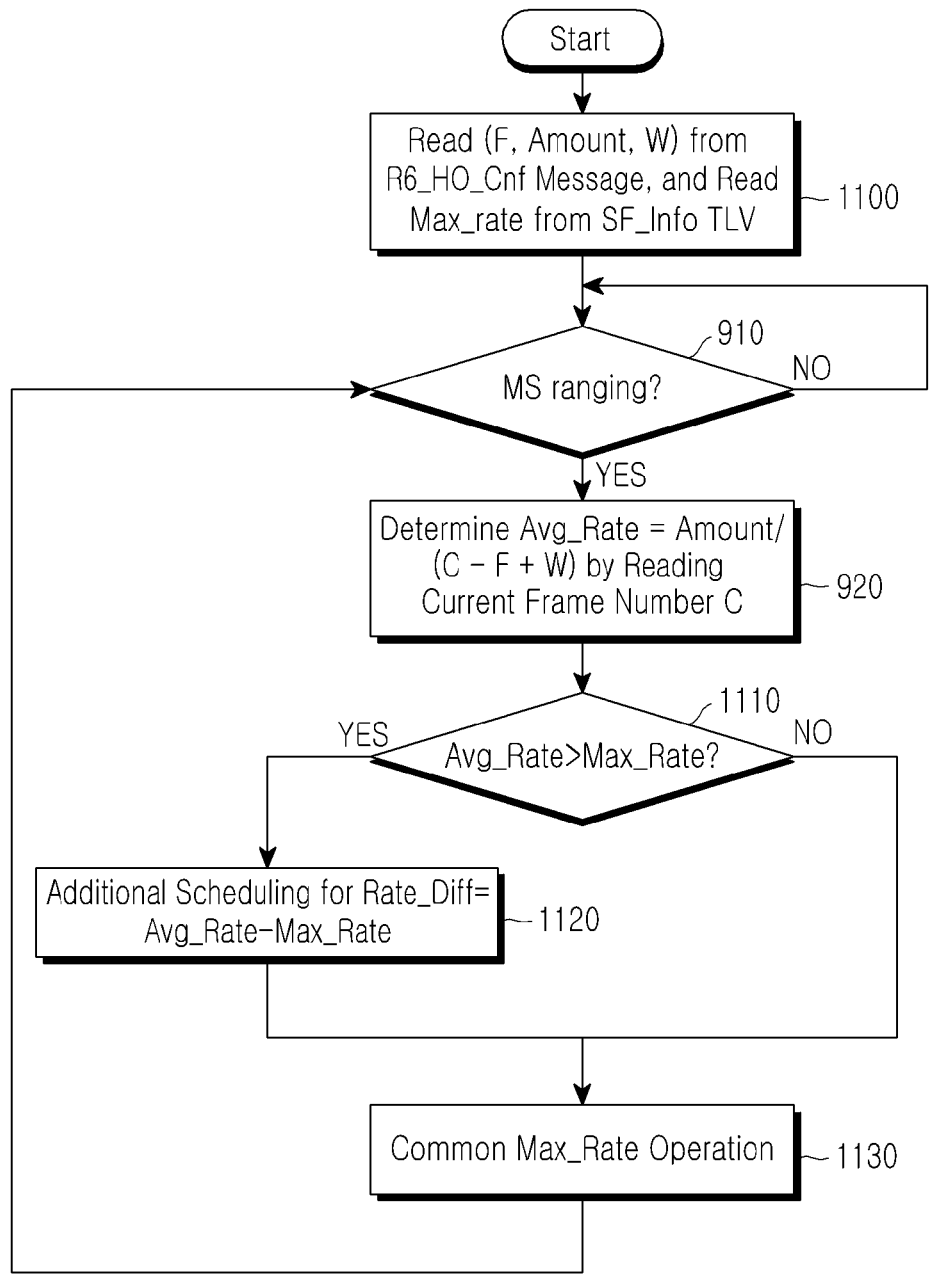
FIG. 11 is a diagram showing a QoS compensation/correction algorithm for maximum reserved rate processing in a target BS according to an exemplary embodiment of the present invention.

Exemplary QoS compensation processes in a target BS are shown in FIGS. 9 to 11, for different QoS class types.

The controlled handover is considered in all of FIGS. 9 to 11. That is, the F, Amount, and W are read from the R6_HO_Cnf message. On the other hand, in the case of the uncontrolled handover, the F, Amount, and W are read from the R6_Context_Rpt message.

FIG. 9 is a diagram showing a QoS compensation/correction algorithm for handling grants that a target BS has failed to transmit/receive during a handover break time, according to an exemplary embodiment of the present invention. More specifically, a QoS compensation process for the Uni GS service is shown.

Referring to FIG. 9, in the case of Unsolicited Grant Service (UGS), the target BS determines the number of grants it has failed to transmit/received during a handover break time by determining the handover break time based on the received information F, and sends a large-sized grant with which it can send the failed grants continuously or at once, at a handover completion time, thereby immediately satisfying the MS's QoS requirements.

In step 900, the target BS 220 reads information about a handover break time, a data rate, and a rate window, included in an R6_HO_Cnf message received from the serving BS 210. In step 910, the target BS 220 determines if the MS 200 has performed ranging to the target BS 220. If it is determined in step 910 that the ranging has not been completed, the target BS 220 waits for the completion. On the other hand, if it is determined in step 910 that the ranging has been completed, the target BS 220 determines a handover break time from the read information in step 920. In step 930, the target BS 220 determines if there are any grants it has failed to transmit/receive during the handover break time. As one example of the determination, in the case where grants are transmitted/received at intervals of a specific period, if the handover break time is longer than the specific period, the target BS 220 may determine that there are failed grants. If it is determined in step 930 that there are failed grants, the target BS 220 performs additional scheduling for the failed grants in step 940. For example, the additional scheduling may include sending a large-sized grant with which the target BS 220 can send the failed grants consecutively or at once. In step 950, the target BS 220 performs common QoS scheduling for the UGS service type. On the other hand, if it is determined in step 930 that there are not failed grants, the target BS 220 proceeds directly to step 950.

FIG. 10 is a diagram showing a QoS compensation/correction algorithm for minimum reserved rate processing in a target BS according to an embodiment of the present invention.

Referring to FIG. 10, even for an SF such as rtPS in which the minimum reserved rate is set, the amount of allocated DL resources and the amount of allocated UL grants, which should be compensated at the handover completion time, may be derived by reflecting the last transmission/reception time and the amount of transmitted/received data.

The QoS compensation process of FIG. 10 is substantially the same as that of FIG. 9, but different as follows. In step 1000, the target BS 220 reads a minimum reserved rate Min_rate in addition to the history information related to data transmission/reception during the handover break time, and then proceeds to step 910. After determining an average data rate in step 920, the target BS 220 compares the average data rate with the minimum reserved rate in step 1010. If the average data rate is less than the minimum reserved rate in step 1010, the target BS 220 performs additional scheduling to compensate for a difference between the average data rate and the minimum reserved rate in step 1020. If the average data rate is not less than the minimum reserved rate, the target BS 220 performs a common operation according to the minimum reserved rate in step 1030.

FIG. 11 is a diagram showing a QoS compensation/correction algorithm for maximum reserved rate processing in a target BS according to an embodiment of the present invention.

Referring to FIG. 11, even for the nrtPS or BE SF in which the maximum sustained rate is set, the target BS 220 may perform detailed and precise control so as not to allocate resources or grants, exceeding the maximum sustained rate, by reflecting the last transmission/reception time and the amount of transmitted/received data.

The QoS compensation process of FIG. 11 is also substantially the same as that of FIG. 9, but different as follows. In step 1100, the target BS 220 reads a maximum sustained rate Max rate in addition to the history information about data transmission/reception during the handover break time, and proceeds to step 910. After determining an average data rate in step 920, the target BS 220 compares the average data rate with the maximum sustained rate in step 1110. If the average data rate is greater than the maximum sustained rate in step 1110, the target BS 220 performs additional scheduling to compensate for a difference between the average data rate and the maximum sustained rate in step 1120. However, if the average data rate is not greater than the maximum sustained rate, the target BS 220 performs a common operation according to the maximum sustained rate in step 1130.

As is apparent from the foregoing description, a target BS can accurately find a handover break time and the amount of data transmission/reception in a serving BS at the time an MS has been handed over to the target BS, enabling fast and adequate QoS compensation/correction for each QoS class by reflecting the findings, and thus facilitating flexible, efficient and accurate QoS provisioning regardless of controlled handover and uncontrolled handover.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for compensating Quality of Service (QoS) during a handover of a Mobile Station (MS) by a serving Base Station (BS) in a wireless broadband access system, the method comprising:
    generating a message during a handover from the serving BS to a target BS, the message including a data transmission/reception time just before the handover and at least one of a size of a time window for which a data transmission/reception history is recorded in an accumulated way and an amount of data transmitted/received during the time window; and
    transmitting the message to the target BS,
    wherein the message is used to calculate at least one of a handover break time and data rate during the handover break time at the target BS, in order to compensate the QoS, and
    wherein if it is determined, by the target BS, that there is a grant that the target BS has failed to transmit/receive during the handover break time, the failed grant is compensated by the target BS.

2. The method of claim 1, further comprising recording in a database a data transmission/reception history including at least one of the data transmission/reception time, the size of a time window, and the amount of transmitted/received data.

3. The method of claim 1, wherein the message comprises a handover configuration (HO_Cnf) message that the serving BS transmits after receiving a handover indication (HO_IND) message from the MS.

4. The method of claim 1, wherein the message comprises a context report (Context_Rpt) message responsive to a context request (Context_Req) message from the target BS.

5. A serving Base Station (BS) apparatus for compensating Quality of Service (QoS) during a handover of a Mobile Station (MS) in a wireless broadband access system, the apparatus comprising:
    a control module for generating a message including a data transmission/reception time just before the handover and at least one of a size of a time window for which a data transmission/reception history is recorded in an accumulated way and an amount of data transmitted/received during the time window; and
    a transmission module for transmitting the message to a target BS,
    wherein the message is used to calculate at least one of a handover break time and data rate during the handover break time at the target BS, in order to compensate the QoS, and
    wherein if it is determined, by the target BS, that there is a grant that the target BS has failed to transmit/receive during the handover break time, the failed grant is compensated by the target BS.

6. The serving BS apparatus of claim 5, further comprising a database for recording a data transmission/reception history including at least one of the data transmission/reception time, the size of a time window, and the amount of transmitted/received data.

7. The serving BS apparatus of claim 5, wherein the message comprises a handover configuration (HO_Cnf) message, which is transmitted to the target BS in response to a handover indication (HO_IND) message from the MS.

8. The serving BS apparatus of claim 5, wherein the message comprises a context report (Context_Rpt) message responsive to a context request (Context_Req) message from the target BS.

9. A method for compensating Quality of Service (QoS) during a handover of a Mobile Station (MS) by a target Base Station (BS) in a wireless broadband access system, the method comprising:
    receiving a message including a data transmission/reception time just before the handover and at least one of a size of a time window for which a data transmission/reception history is recorded in an accumulated way and an amount of data transmitted/received during the time window;
    reading from the message the data transmission/reception time and at least one of the size of the time window and the amount of transmitted/received data, and determining a data rate during a handover break time using a predetermined value if there is information that is missing from the message; and
    performing QoS compensation during the handover break time using the data rate,
    wherein the performing of the QoS compensation comprises:
        determining whether there is a grant that the target BS has failed to transmit/receive during the handover break time; and
        compensating for the failed grant.

10. The method of claim 9, wherein the message comprises a handover configuration (HO_Cnf) message that a serving BS transmits to the target BS after receiving a handover indication (HO_IND) message from the MS.

11. The method of claim 9, wherein the message comprises a context report (Context_Rpt) message that a serving BS transmits to the target BS in response to a context request (Context_Req) message from the target BS.

12. The method of claim 9, further comprising:
reading a minimum reserved rate from the message;
determining whether the determined data rate is less than the minimum reserved rate; and
performing scheduling to compensate for a difference between the data rate and the minimum reserved rate.

13. The method of claim 9, further comprising:
reading a maximum sustained rate from the message;
determining whether the determined data rate is greater than the maximum sustained rate; and
performing scheduling to compensate for a difference between the maximum sustained rate and the data rate.

14. The method of claim 9, wherein the determining of the data rate comprises using the equation:

$$\mathrm{Avg\_Rate} = \mathrm{Amount}/(C-F+W)$$

where C represents a current frame number computed from the current time, Amount represents the amount of data just before the break time, F represents a frame number during data transmission/reception, computed from the transmission/reception time, and W represents a size of a rate window, if there is not information that is missing from the message.

15. A target Base Station (BS) apparatus for compensating Quality of Service (QoS) during a handover of a Mobile Station (MS) in a wireless broadband access system, the apparatus comprising:
a reception module for receiving a message including a data transmission/reception time just before the handover and at least one of a size of a time window for which a data transmission/reception history is recorded in an accumulated way and an amount of data transmitted/received during the time window; and
a control module for reading from the message the data transmission/reception time and at least one of the size of the time window and the amount of transmitted/received data, determining a data rate just before the handover using a predetermined value if there is information that is missing from the message, for performing QoS compensation during a handover break time using the data rate, for determining whether there is a grant that the target BS has failed to transmit/receive during the handover break time, and for compensating for the failed grant, thereby performing QoS compensation.

16. The apparatus of claim 15, wherein the message comprises a handover configuration (HO_Cnf) message that a serving BS transmits to the target BS after receiving a handover indication (HO_IND) message from the MS.

17. The apparatus of claim 15, wherein the message comprises a context report (Context_Rpt) message that a serving BS transmits to the target BS in response to a context request (Context_Req) message from the target BS.

18. The apparatus of claim 15, wherein the control module reads a minimum reserved rate from the message, determines whether the calculated data rate is less than the minimum reserved rate, and performs scheduling to compensate for a difference between the data rate and the minimum reserved rate, thereby performing QoS compensation.

19. The apparatus of claim 15, wherein the control module reads a maximum sustained rate from the message, determines whether the calculated data rate is greater than the maximum sustained rate, and performs scheduling to compensate for a difference between the maximum sustained rate and the data rate, thereby performing QoS compensation.

20. The apparatus of claim 15, wherein the control module determines the data rate comprises using the equation:

$$\mathrm{Avg\_Rate} = \mathrm{Amount}/(C-F+W)$$

where C represents a current frame number computed from the current time, Amount represents the amount of data just before the break time, F represents a frame number during data transmission/reception, computed from the transmission/reception time, and W represents a size of a rate window, if there is not information that is missing from the message.

* * * * *